(12) United States Patent
Nicholas et al.

(10) Patent No.: US 9,982,707 B2
(45) Date of Patent: May 29, 2018

(54) INTEGRATED CENTER BEARING ASSEMBLY

(71) Applicant: Ford Global Technologies, LLC, Dearborn, MI (US)

(72) Inventors: Chris Peter Nicholas, Milford, MI (US); Anthony Paskus, Rochester Hills, MI (US); Marshall Erin Bates, Belle River (CA)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/212,397

(22) Filed: Jul. 18, 2016

(65) Prior Publication Data

US 2018/0017097 A1 Jan. 18, 2018

(51) Int. Cl.
*F16C 3/02* (2006.01)
*F16C 19/26* (2006.01)
*F16C 19/06* (2006.01)
*F16D 3/38* (2006.01)

(52) U.S. Cl.
CPC .............. *F16C 3/023* (2013.01); *F16C 19/06* (2013.01); *F16C 19/26* (2013.01); *F16D 3/387* (2013.01); *F16C 2326/06* (2013.01)

(58) Field of Classification Search
CPC .......... F16C 3/023; F16C 19/26; F16C 19/06; F16C 2326/06; F16D 3/387
See application file for complete search history.

(56) References Cited

U.S. PATENT DOCUMENTS

| 4,392,694 | A | | 7/1983 | Reynolds | |
|---|---|---|---|---|---|
| 4,749,301 | A | * | 6/1988 | Suzuki | A01B 71/06 403/322.2 |
| 4,813,810 | A | * | 3/1989 | Suzuki | F16D 1/116 403/322.2 |
| 5,145,025 | A | * | 9/1992 | Damian | F16F 15/02 180/381 |
| 5,452,957 | A | | 9/1995 | Duggan | |
| 6,422,947 | B1 | * | 7/2002 | Kelly | B60K 17/24 464/178 |
| 6,666,614 | B2 | * | 12/2003 | Fechter | F16D 1/108 403/321 |
| 8,784,220 | B1 | | 7/2014 | Katke | |
| 2002/0139603 | A1 | * | 10/2002 | Aiken | B60K 17/24 180/381 |
| 2004/0022467 | A1 | * | 2/2004 | Robb | B60K 17/24 384/536 |
| 2005/0029861 | A1 | | 2/2005 | Schnurr et al. | |
| 2015/0098756 | A1 | * | 4/2015 | Brunazzi | F16D 1/116 403/328 |
| 2017/0051793 | A1 | * | 2/2017 | Eversole | F16D 3/387 |
| 2017/0190216 | A1 | * | 7/2017 | Schick | B60B 35/18 |
| 2017/0204898 | A1 | * | 7/2017 | Tomogami | F16C 11/04 |

FOREIGN PATENT DOCUMENTS

DE 102004051002 A1 9/2006

* cited by examiner

*Primary Examiner* — Darlene P Condra
(74) *Attorney, Agent, or Firm* — James Dottavio; Brooks Kushman P.C.

(57) ABSTRACT

A driveshaft assembly of a vehicle includes a yoke assembly having a shaft extending between a yoke and a flange. The yoke assembly further includes a bearing having an inner race integrally formed on an outer surface of the shaft, an outer race circumscribing the inner race, and a plurality of rotating elements rollably engaging between the inner and outer races. A tube is attached to the flange.

16 Claims, 2 Drawing Sheets

INTEGRATED CENTER BEARING ASSEMBLY

TECHNICAL FIELD

The present disclosure relates to a bearing assembly having an inner race of the bearing integrally formed on an outer surface of the driveshaft.

BACKGROUND

Motor vehicles typically include an engine for propelling the vehicle. The engine is connected to a transmission that modifies the engine output to a desired speed ratio. A driveshaft (also known as a propshaft) is driveably connected between an output of the transmission and a differential to transmit torque to the driven wheels. The driveshaft is secured to a chassis of the vehicle with a bracket assembly. The bracket assembly includes a bearing having an inner race fixed to the driveshaft and an outer race fixed to the bracket.

SUMMARY

According to one embodiment, a driveshaft assembly of a vehicle includes a yoke assembly having a shaft extending between a yoke and a flange. The yoke assembly further includes a bearing having an inner race integrally formed on an outer surface of the shaft, an outer race circumscribing the inner race, and a plurality of rotating elements rollably engaging between the inner and outer races. A tube is attached to the flange.

According to another embodiment, a driveshaft assembly of a vehicle includes a rotatable shaft having a tube portion and a yoke portion that has an outer surface machined such that a bearing inner race is formed thereon. A bearing outer race circumscribes the inner race. A plurality of bearing elements rollably engaging between the inner and outer races.

According to yet another embodiment, a vehicle includes a chassis and a driveshaft. The driveshaft includes a tube and a yoke assembly having a flange connected to the tube, a yoke, and a shaft connecting between the flange and the yoke. The shaft defines an integral inner race of a center bearing that further includes an outer race circumscribing the inner race and bearing elements rollably engaging between the inner and outer races. A bracket secures the bearing to the chassis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
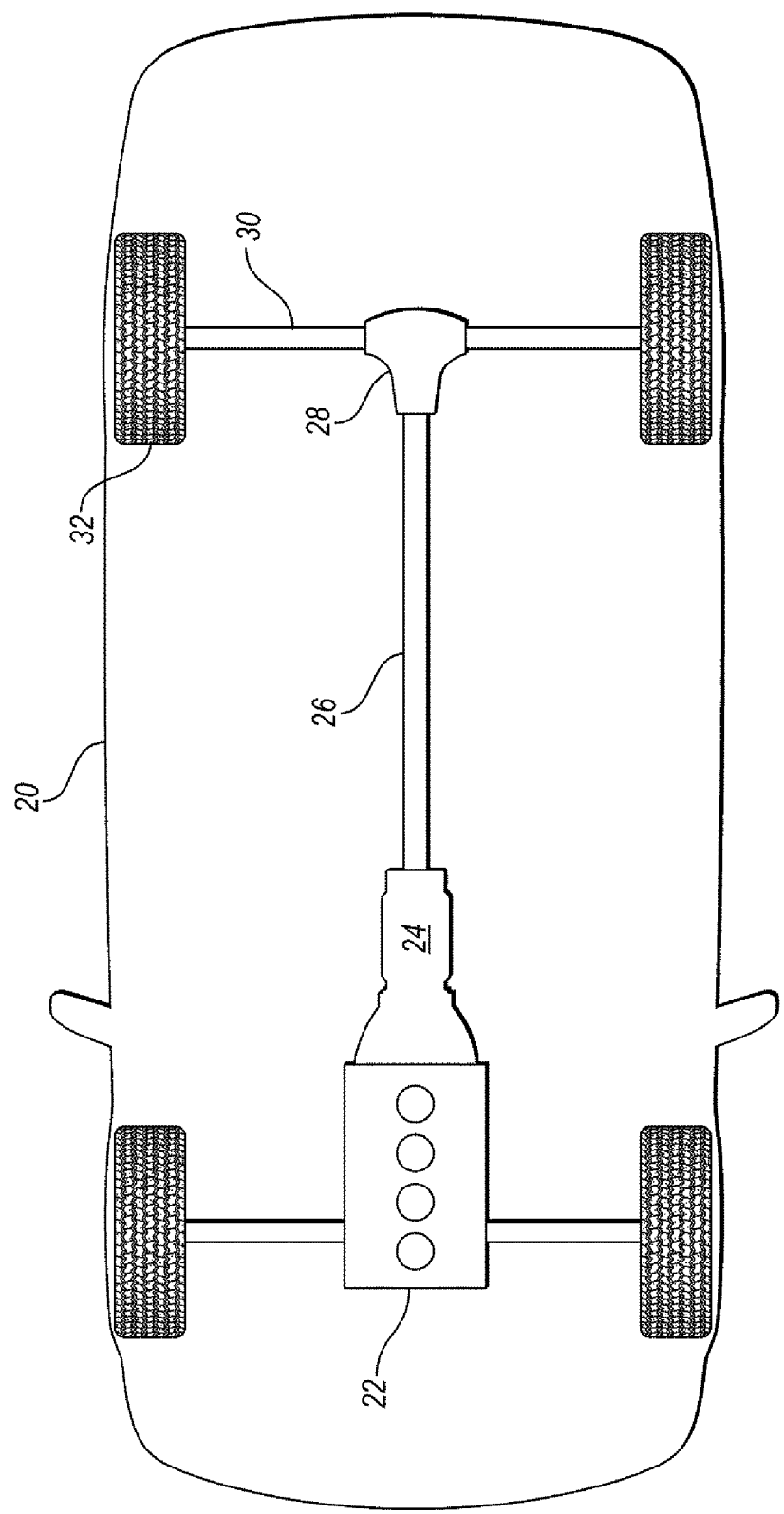
FIG. 1 is a schematic diagram of a vehicle.

Referring to FIG. 1, a vehicle 20 (such as a front engine, rear-wheel drive vehicle or a four-wheel drive vehicle) may include an engine 22 and a transmission 24. The transmission 24 includes an output shaft that is coupled to a front end of a driveshaft 26. The rear end of the driveshaft 26 is coupled to the rear differential 28. The driveshaft may be coupled via universal joints (U-joints), constant-velocity joints (CV Joints), or the like. The driveshaft 26 transmits power from the transmission 24 to a final drive disposed within the rear differential 28. The final drive is driveably connected to the rear wheels 32 via one or more rear axles 30. If the vehicle is four-wheel drive, the front end of the driveshaft 26 is coupled to the transfer case. The driveshaft 26 may include a center bearing (not shown) to support the driveshaft to the vehicle chassis. This will be explained in more detail below.

Figure 2:
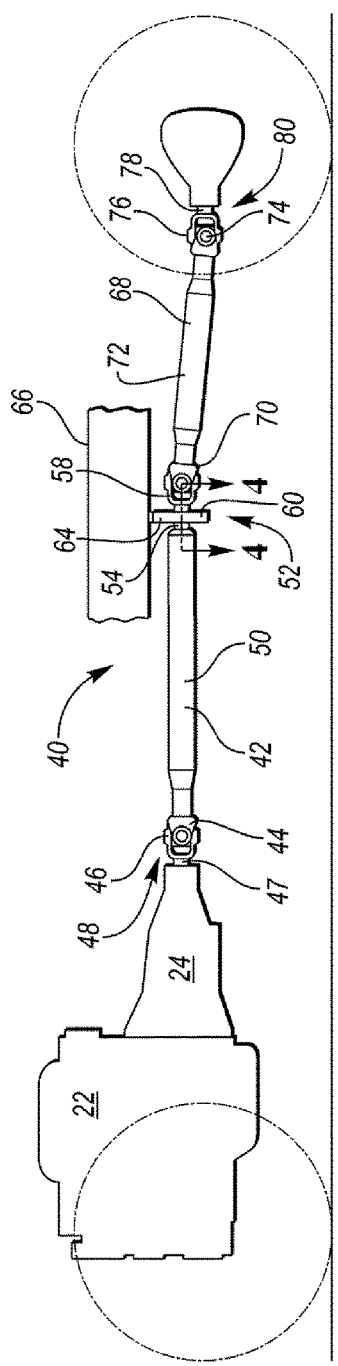
FIG. 2 is a schematic diagram of a driveshaft assembly.
Figure 3:
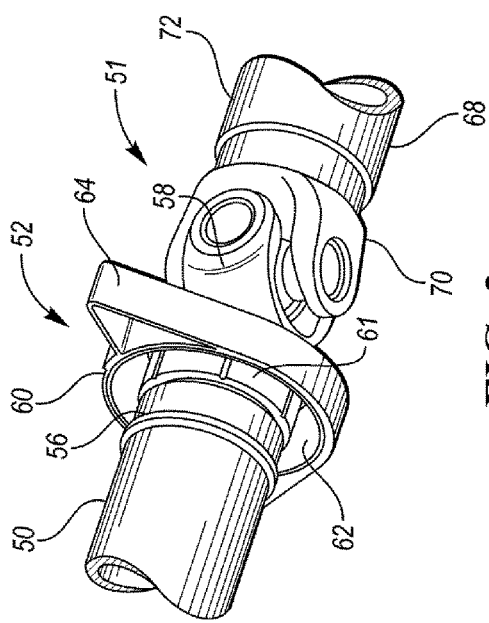
FIG. 3 is perspective view of a portion of the driveshaft assembly.

The following figures and related description describe an example driveshaft assembly that may be utilized in the vehicle 20. Referring to FIGS. 2 and 3, the driveshaft assembly 40 includes a front shaft 42 including a yoke 44 that couples to a yoke 46 of the transmission output shaft 47 at a forward U-joint 48. The yoke 44 includes a flange that is connected to a tube 50 via welding or other means known in the art. The tube 50 extends rearwardly from the yoke 44 and terminates at a yoke assembly 52.

The yoke assembly 52 includes a shaft 54 having a flange 56 that is connected to the rear end of the tube 50 and a yoke 58 that couples with the rear shaft 68. The rear shaft 68 includes a yoke 70 that connects with the yoke 58 at an intermediate U-joint 51. The yoke assembly 52 also includes a center-bearing assembly 60 that supports the front shaft 42. The center-bearing assembly 60 includes a roller bearing 61 (e.g., ball bearing, needle bearing, etc.) surrounded by a resilient member 62 that may be formed of an elastomeric material such as rubber. The resilient member 62 is disposed in a bracket 64 that mounts to a chassis 66 of the vehicle. The roller bearing 61 is disposed around the shaft 54.

The rear shaft 68 also includes a tube 72 that is connected to the yoke 70 at a forward end and connected to a yoke 74 at a rear end. The yoke 74 is coupled to a yoke 76 disposed on a differential input shaft 78. The yokes 74 and 76 may be coupled via a rear U-joint 80. It is to be understood that the U-joints could instead be CV joints or similar coupling means.

Typically, center bearings include inner and outer races and a plurality of rolling elements (e.g., metal balls) disposed therebetween. The races are stand-alone component that are assembled together. The outer race is disposed against the resilient member and the inner race defines a hole having a perimeter that is disposed against a shaft portion of the yoke. In many cases, the inner race is press fit to the shaft. This disclosure presents a center bearing where the inner race is integrally formed on the outside surface of the driveshaft. This eliminates the need for a separate inner race as is traditionally done. Integrating the inner race on the outer surface of the driveshaft eliminates a component of the bearing assembly leading to reduced costs and weight.

Figure 4:
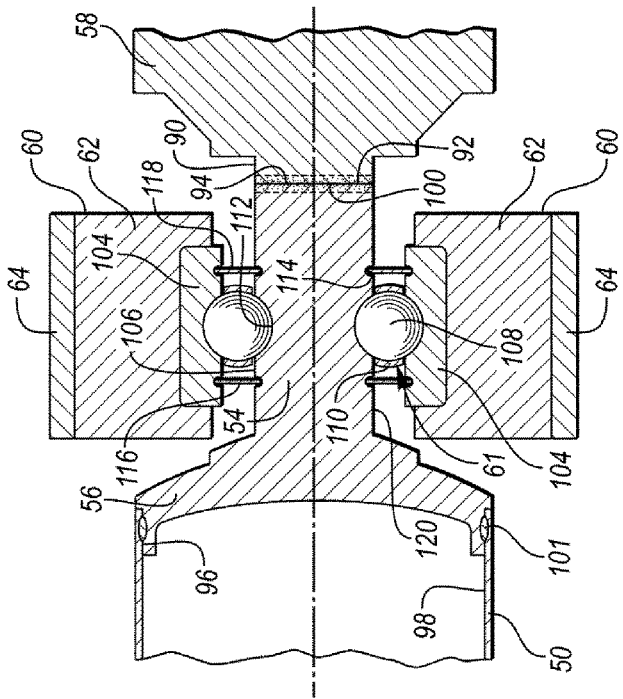
FIG. 4 is a top view, in cross section, of a yoke assembly of the driveshaft along cut line 4-4.

Referring to FIG. 4, the shaft 54 and the flange 56 may be formed as a single piece. For example, the shaft and the flange may be machined from a single piece of bar stock. Or, the flange and shaft may be separately formed and joined together. The yoke 58 may be formed as a separate piece and then joined to the shaft 54. The yoke 58 may include a stub 90 having an end face 92 that is welded to an end face 94 of the shaft 54. The stub 90 and the shaft 54 may be joined via a friction weld 100 in one embodiment. Other types of joining techniques may be used in other embodiments. The stub 90 and the shaft 54 may have the same diameter. While the shaft 54 is illustrated as solid, the shaft 54 could include a hollow interior in order to reduce weight of the yoke assembly.

The flange 56 may define a lip 96 recessed into the outer surface of the flange. The depth of the lip 96 may correspond with a wall thickness of the tube 50. The tube 50 is received onto the flange 56 such that a portion of the flange is disposed against an inside surface 98 of the tube. The tube 50 may be welded to the lip of the flange 56 by a weld 101. Of course, other joining techniques may be used.

The center-bearing assembly 60 supports the driveshaft assembly 40 to the vehicle while allowing free rotation of the shaft. The roller bearing 61 includes an outer race 104 secured to the resilient member 62 (also known as a bushing). The resilient member absorbs vibrations from the driveshaft to prevent them from traveling to the chassis. The resilient member 62 is in turn secured to the bracket 64, which attaches the center bearing assembly 60 to the chassis of the vehicle. As explained above, the typical, stand-alone, inner race is being integrally formed on an outer surface 120 of the shaft 54. To do this, the shaft 54 may first be hardened to exceed 60 on the Rockwell hardness C scale.

After the shaft 54 is hardened, the shaft may be machined such that an integrally-formed inner race 106 is formed on the outer surface 120 of the shaft 54. The inner race 106 may include an annular groove 112 recessed into the outer surface 120. The groove 112 may extend along the entire circumference of the outer surface 120. The groove 112 receives the rotating elements 108. The rotating elements 108, also known as bearing elements, are typically made of metal and are disposed within a chamber defined between the inner race 106 and the outer race 104. The rotating elements 108 rollably engage between the inner and outer races allowing for low-friction, relative movement between the races. The rotating elements 108 may be secured within a cage 110 to fix the position of the rotating elements relative to each other. The bearing 61 includes first and second seals 116, 118 on either side of the bearing elements 108 to seal the chamber and prevent the bearing lubricant (e.g., grease) from leaking out of the bearing and prevent dirt or other contaminants from entering into the bearing. The inner race 106 may include slots 114 machined into the outer surface 120. The slots may extend around the entire circumference of the outer surface. The slots 114 cooperate with slots defined in the outer race 104 to secure the seals 116, 118. Depending upon the type of roller bearing use, the rotating elements 108 may be balls if the bearing is a ball bearing, or cylinders if the bearing is a needle bearing.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A driveshaft assembly of a vehicle comprising:
a yoke assembly including
a shaft extending between a yoke and a flange, and
a bearing including an inner race integrally formed on an outer surface of the shaft and defining a groove recessed therein, an outer race circumscribing the inner race, and a plurality of rotating elements rollably engaging between the inner and outer races and disposed in the groove; and
a tube attached to the flange.

2. The driveshaft assembly of claim 1, wherein the inner race defines a first slot recessed into the outer surface of the shaft, and a first bearing seal is disposed in the first slot.

3. The driveshaft assembly of claim 2, wherein the inner race defines a second slot recessed into the outer surface of the shaft, and a second bearing seal is disposed in the second slot.

4. The driveshaft assembly of claim 3, wherein the groove is disposed between the first and second slots.

5. The driveshaft assembly of claim 1, wherein the yoke further includes a stub having an end face disposed against an end face of the shaft, and wherein the shaft and stub are joined via a weld.

6. The driveshaft assembly of claim 1, wherein the shaft has a hardness exceeding 60 on the Rockwell hardness C scale at the inner race.

7. The driveshaft assembly of claim 1, wherein the rotating elements are one of ball bearings and needle bearings.

8. A driveshaft assembly of a vehicle comprising:
a rotatable shaft including a tube portion and a yoke portion that has an outer surface machined such that a bearing inner race is formed thereon;
a bearing outer race circumscribing the inner race and defining a slot;
a plurality of bearing elements rollably engaging between the inner and outer races; and
a bearing seal is disposed in the slot.

9. The driveshaft assembly of claim 8, wherein the outer surface defines an annular groove, and the bearing elements are disposed in the annular groove.

10. The driveshaft assembly of claim 8, wherein the yoke portion further includes a yoke connected to a spindle of the yoke portion via a weld.

11. The driveshaft assembly of claim 8, further comprising a second rotatable shaft having a second yoke connected to the yoke via a coupling.

12. The driveshaft assembly of claim 8, wherein the shaft has a hardness exceeding 60 on the Rockwell hardness C scale at the inner race.

13. The driveshaft assembly of claim 8, further comprising a bracket assembly including a resilient member circumscribing the bearing outer race and a bracket circumscribing the resilient member.

14. A vehicle comprising:
   a chassis;
   a driveshaft including a tube and a yoke assembly having a flange connected to the tube, a yoke, and a shaft connecting between the flange and the yoke, the shaft defining an integral inner race of a center bearing that defines an annular groove and first and second slots on opposite sides of the annular groove, the center bearing including an outer race circumscribing the inner race and bearing elements rollably engaging between the inner and outer races, wherein at least one of the bearing elements is disposed in the annular groove;
   a first bearing seal disposed in the first slot;
   a second bearing seal disposed in the second slot; and
   a bracket securing the bearing to the chassis.

15. The vehicle of claim 14, wherein the shaft has a hardness exceeding 60 on the Rockwell hardness C scale at the inner race.

16. The vehicle of claim 14, wherein the tube has a larger diameter than the shaft.

* * * * *